7948X
E. Nott,
Cook Stove.
Patented Jan. 2. 1834.
Fig; 1.
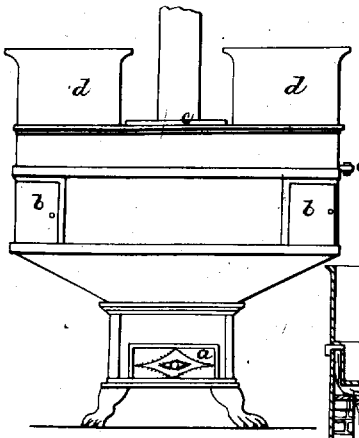
Fig; 2.
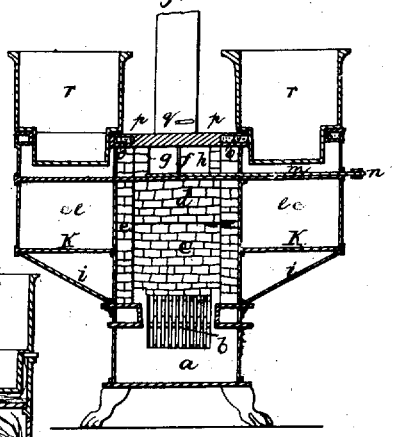
Fig; 7.
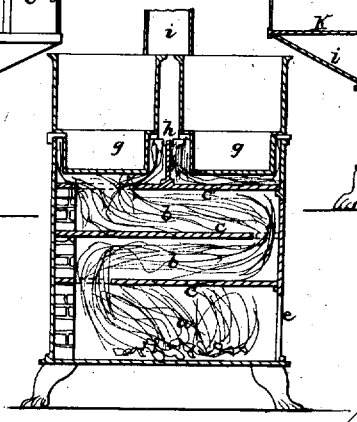
Fig; 3.
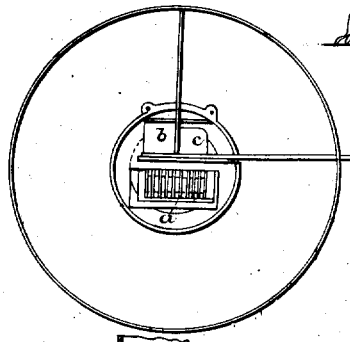
Fig; 8.
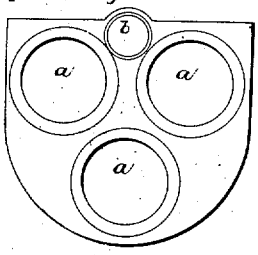
Fig; 4.
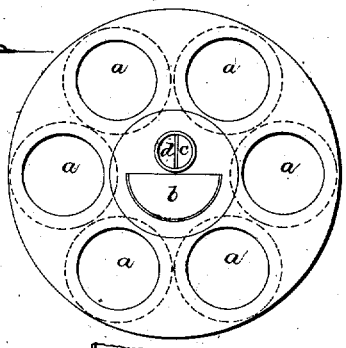
Fig; 5.
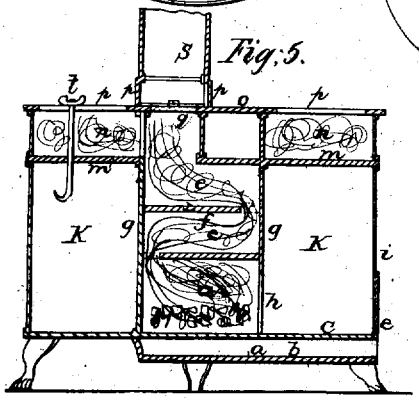
Fig; 6.
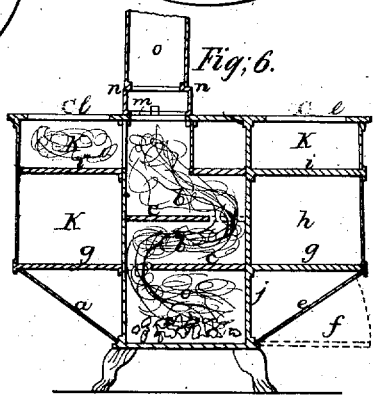

Eliphalet Nott

Letters Patent.

The schedule referred to in these Letters Patent and making part of the same, containing a description in the words of the said Eliphalet Nott, himself of his improvement for preventing the waste of heat in cooking stoves, applicable to other furnaces.

Specification of improvements made for preventing the waste of heat in cook stoves; applicable to other furnaces. Whereas in ~~ine~~ cook stoves having ovens under or around which the flame passes, much heat escapes to the room without producing any useful effect, therefore, an improvement has been introduced which consists In such an adjustment of the chambers of combustion and treatment that the heat in escaping from the former must pass through the latter, and be in passing reflected back by an exterior crust of sheet tin or some material suited to that purpose which may be effected by making use of a vertical hollow cylinder for the chamber of combustion and by enclosing the same to nearly one third of its height with an envelope of sheet tin, or other good reflector in the form of a hollow truncated ~~im~~ cone inverted, the diameter of the upper base of which is ~~or~~ about three times that of its lower base, and the diameter of its lower base about equal to that of the cylinder which it encloses; and, by placing over this first cavity contained between the crust of the interior cylinder, and the exterior cone, a circular horizontal flat ~~plate~~ pierced by a central opening corresponding in size to the size of the cylinder occupying the same. Said flat constituting at once the ceiling of the cavity beneath, and the floor of the oven above it;

and and, by raising on the outer margin of said floor a concen=
tric hollow cylinder in sheet tin or other reflector fur=
=nished with doors and having an elevation somewhat
greater than one third of the elevation of the central cylin=
=der it encloses.— And by placing over this second contained
cavity, or oven, a second and similar circular flat; and by
raising on the outer margin of said second circular flat
a second concentric cylinder in sheet tin quite to the top of the
central cylinder, the same to be lined with brick or other non
nonconducting material.— And, by placing over this third
contained cavity which is the chamber for boilers a third
circular flat pierced not only centrally, for the contained
cylinder, ~~but~~, but also for kettles occupying the space exter
=or thereto, and having a rim or margin raised from one
to two inches high, around each contained aperture and
also around the periphery of the flat itself and, by placing
over this covering of the chamber, for boilers a second
one pierced in the same manner (the two being stayed apart
by the rims aforesaid in such manner that a space is left
between them, the same to be filled with sand or other non=
conducting material unless the upper flat be of sheet tin,
zinc, or other polished metallic substance;— And, by throwing
a partition across the circular chamber for boilers surrounding
the chamber of combustion: And by opening a passage from the
chamber of combustion to the chamber for boilers on the one
side of said partition and from the chamber for boilers to
the pipe or flue on the other side of said partition, or, if
passages be opened on both sides of said partition to and from
said chamber, the same to be so governed, by valves, that
the flame can be passed at pleasure through said chambers
in the one, or in the other direction. Or which may be effect
=ed by making use of two concentric hollow cylinders or
prisms, both resting on the hearth or bottom— The calibre
of the of the interior one constituting the chamber of combustion
and flue for flame to pass off in, either direct, or by rever-
beration; as preferred; the inner of the exterior one, con-
stituting the inner of the oven; and the space between the
two, the oven itself; The requisite apertures for ingress and
egress being provided in each, and both being surmounted
by a horizontal flue or chamber for containing boilers or
griddles &c. It is to be understood that a second exterior
lamina may, if necessary, be added; and the space between
the two filled with sand or left vacant as preferred – and
it is, also, to be understood that the exterior prism when
prisms, are employed, may, if desired, be so contracted,
towards its lower extremity as to close around the interior
prism. Or, which may be more or less perfectly effected,
by adjusting in like manner, especially if wood be the fuel
in use, separate ovens on the sides of a chamber of combus-
tion; Or, even a single oven on a single side; provision being
made in such case for the ingress of fuel, laterally at one
end, and the egress of flame, vertically, at the other; the
same to be passed horizontally over the ceiling of said
chamber, to the end at which the fuel enters, and thence
upward; into the chamber for boilers which rests thereon,
and provision being also made for preventing the escape
of heat, from the side on which there is no oven, by the
interposition of a brick wall, along the same; or by any
other manner of adjustment preferred; Provided, only,
an oven, heated by radiation and reflection, and the outer
crust of which is a sheet tin reflector, or a reflector of
any other material, be so combined with a chamber of
combustion, in a cook stove, as to form an integral part
thereof. – For further information, reference must be
had to the drawings and explanations connected herewith <u>Summary</u>. The invention and improvements
herein 7948X Jan 9, 1834 herein contemplated consists, in preventing the waste of
heat in cook stoves. By adjusting the chamber of combustion
centrally, and surrounding the same, as far as may be by
the chamber or chambers of treatment, in such manner that
the heat, in escaping to the room from the former, must pass
through the latter, and be, in passing, either reflected by an
exterior crust that is a ref[illegible], or arrested by one that
is a nonconductor — either in single or double lamina;
and, if double, with an empty space, or a stratum of non=
conducting material between the two — which may be
effected by a combination of concentric hollow cylinders
or prisms of the kind, and in the manner aforesaid, or
by any other combination preferred, — also, by combining
separate ovens, having an exterior crust of hammered sheet
tin, common sheet tin, polished iron, or other metallic re
flector, with a central chamber of combustion and flue
for flame, either reverberated or not, in such manner
that the former shall be heated by a radiation and reflec
=tion from the latter, and each form an integral part of
the same instrument. Or, by combining in a similar man=
ner a single similar oven to be heated as aforesaid, with an
adjoining chamber of combustion, and flue for flame, —
whether reverberated or not; from the opposite side of
which chamber of combustion and flue, the escape of
heat is prevented by a lining of brick or other nonconduct-
ing material. — By adding a second covering to the upper sur=
face of the chamber for boilers, and to such other parts of the
stove as will diffuse heat, unnecessarily, without such
covering. — And unless such second covering be a good re=
flector, by filling the space between the two, which should
be from one to two inches with sand, or other nonconduct
=ing material, — and, — In preventing the unnecessary diffu=
sion of heat and steam, — By suspending over the entire
stove stove, especially in summer, a sheet tin, or other metallic
canopy, with an outlet at the apex, connecting with the
chimney. I therefore claim as my invention and improve
-ment, the preventing of the waste of heat in cook stoves,
By adjusting the chamber of combustion centrally, and surround
-ing the same as far as may be, by the chamber or chambers of
treatment, in such manner, that the heat, in escaping from
the former, must pass through the latter; and being impinging
either reflected by an exterior crust, that is a reflector, or
arrested by one that is a nonconductor; either in single lami
-na, or double laminae, with an intermediate stratum of air,
or other nonconducting material – whether the same be effect
-ed by a combination of concentric hollow cylinders or prisms
as aforesaid, or by any other combination preferred. and
also – By combining separate ovens having an exterior
crust of hammered sheet tin, common sheet tin, polished
iron, zinc, copper, brass, or other reflector, with a central
chamber of combustion, and flue for flame, whether
reverberated or not, in such manner that the former
shall be heated, from the latter by radiation and reflection,
and each form an integral part of the same instrument,
Or, by combining in a similar manner, a single similar
oven, to be heated as aforesaid, with a similar adjoining
chamber, and flue for flame, from the opposite side of
which the escape of heat is prevented, by a lining of
brick or other nonconducting material – and, –
By adding in combination a second upper covering to the
chamber, for boilers, and such other parts of the stove as will
diffuse heat, unnecessarily, without such second cover
-ing; and interposing sand or other nonconducting material
between the two, unless the same be a good reflector, and –
By preventing in like manner, the diffusion of heat
and steam through the room, by suspending over the
whole 306. 7948x Jan. 9, 1834 whole a canopy pierced and connected at the apex as aforesaid — together with the uses to which the same has been or may hereafter be applied.

Witnesses

D. Martin. Elisha Lib Nott

Alexander Holland.

Drawing (Granted 9th January 1834) (1782 Lands)